United States Patent
Gogolev et al.

(10) Patent No.: US 12,289,242 B2
(45) Date of Patent: Apr. 29, 2025

(54) VARIABLE PREEMPTION IN TIME SENSITIVE NETWORKS USING PRIORITY REGENERATION

(71) Applicant: ABB Schweiz AG, Baden (CH)

(72) Inventors: Alexander Gogolev, Dachau (DE); Marius-Petru Stanica, Bensheim (DE); Hariram Satheesh, Bengaluru (IN)

(73) Assignee: ABB Schweiz AG, Baden (CH)

( * ) Notice: Subject to any disclaimer, the term of this patent is extended or adjusted under 35 U.S.C. 154(b) by 333 days.

(21) Appl. No.: 17/849,845

(22) Filed: Jun. 27, 2022

(65) Prior Publication Data
US 2022/0417160 A1  Dec. 29, 2022

(51) Int. Cl.
*H04L 47/24* (2022.01)
*H04L 47/127* (2022.01)

(52) U.S. Cl.
CPC .......... *H04L 47/245* (2013.01); *H04L 47/127* (2013.01)

(58) Field of Classification Search
CPC ............................ H04L 47/245; H04L 47/127
See application file for complete search history.

(56) References Cited

U.S. PATENT DOCUMENTS

| | | | | |
|---|---|---|---|---|
| 2007/0041326 | A1* | 2/2007 | Babiarz | H04L 47/17 370/248 |
| 2011/0317587 | A1* | 12/2011 | Lida | H04L 49/557 370/254 |
| 2019/0007941 | A1 | 1/2019 | Cavalcanti et al. | |
| 2020/0259896 | A1* | 8/2020 | Sachs | H04W 56/0065 |

FOREIGN PATENT DOCUMENTS

| | | |
|---|---|---|
| WO | WO 2016/110326 A1 | 7/2016 |
| WO | WO 2021/018087 A1 | 2/2021 |

OTHER PUBLICATIONS

Nasrallah et al., "Ultra-Low Latency (ULL) Networks: A Comprehensive Survey Covering the IEEE TSN Standard and Related ULL Research," *arXiv—Cornell University Library*, 60 pp. (Mar. 20, 2018).

Yin et al., "Simulative Analysis of TSN-based Traffic Scheduling for In-vehicle Network," *2021 2nd International Conference on Artificial Intelligence and Information Systems (ICAIIS)*, pp. 1-7 (May 28-30, 2021).

(Continued)

*Primary Examiner* — Duc C Ho
(74) *Attorney, Agent, or Firm* — Leydig, Voit & Mayer, Ltd.

(57) ABSTRACT

A method for operating a time-sensitive network, TSN, having a first, high-importance segment and a second, low-importance segment, includes remapping, using TSN per-port priority regeneration, priority labels attached to data streams received on the first port and the second port to updated priority labels; splitting the data streams into a "preempting" class and a "preemptable" class based on a mapping from updated priority labels to classes; and forwarding the data streams from a border network element to at least one next-hop network element. When congestion is present on a link to the next-hop network element, the forwarding of "preempting" data streams takes precedence over the forwarding of "preemptable" data streams.

12 Claims, 3 Drawing Sheets

(56) References Cited

OTHER PUBLICATIONS

European Patent Office, Extended European Search Report in European Application No. 21182035.2, 11 pp. (Dec. 22, 2021).
Gogolev et al., "A simpler TSN? Traffic Scheduling vs. Preemption," *2020 25th IEEE International Conference on Emerging Technologies and Factory Automation (ETFA)*, IEEE, 1: 183-189 (Sep. 8-11, 2020).
Gogolev et al., "TSN-Enabled OPC UA in Field Devices," *2018 IEEE 23rd International Conference on Emerging Technologies and Factory Automation (ETFA)*, IEEE, 1: 297-303 (Sep. 4-7, 2018).
Gogolev et al., "TSN Traffic Shaping for OPC UA Field Devices," *2019 IEEE 17th International Conference on Industrial Informatics (INDIN)*, IEEE, 1: 951-956 (Jul. 22-25, 2019).

\* cited by examiner

VARIABLE PREEMPTION IN TIME SENSITIVE NETWORKS USING PRIORITY REGENERATION

CROSS-REFERENCE TO RELATED APPLICATIONS

This patent application claims priority to European Patent Application No. 21182035.2, filed on Jun. 28, 2021, which is incorporated herein in its entirety by reference.

FIELD OF THE DISCLOSURE

The present disclosure relates to the field of time sensitive networks, TSN, that may, for example, be used as a communication medium in distributed control systems, DCS, in industrial plants.

BACKGROUND OF THE INVENTION

Distributed control systems, DCS, for an industrial plant comprises a plurality of controllers, sensors and actuators. Sensors may, for example, deliver measurement values from within an industrial process being executed on the plant. A controller may then, for example, communicate with actuators that physically act upon the process with the goal of keeping the measurement value (such as a temperature or a pressure) at a desired set-point value.

Communication within the DCS requires a fast and reliable delivery of data streams. Dedicated field bus networks are designed to provide the required low latency and reliability, but it is intended to replace multiple proprietary field bus systems with a standardized high performance network. For this purpose, time sensitive networks, TSN, that build upon traditional Ethernet networks are well-known in the art. WO 2020/136 487 A2 discloses a controller for process plants that is able to communicate in a network with a mixture of TSN devices and non-TSN devices.

Configuration of a TSN as a whole may be quite complex and time-consuming depending on the number of participants.

BRIEF SUMMARY OF THE INVENTION

In a general aspect, the present disclosure describes a system and method for facilitating facilitate, and permitting a partial automation of, the configuration of a TSN.

This objective is achieved by a method for operating a TSN according to a first independent claim and by a method for configuring a TSN according to a second independent claim. Further advantageous embodiments are detailed in the respective dependent claims.

In one embodiment, the disclosure describes a method for operating a time sensitive network, TSN. This TSN comprises at least a first, high-importance segment and a second, low-importance segment. The terms "high-importance" and "low-importance" are relative terms with respect to the concrete application at hand. In every application, there will be some data streams whose timely and reliable delivery is more critical than the delivery of other data streams. For example, a measurement value that is captured somewhere in an industrial process and is merely displayed somewhere in the control room is still important to some degree (otherwise it would not be measured in the first place). But the updating of this measurement value is less time-critical than the updating of a measurement value that is part of a closed feedback loop.

BRIEF DESCRIPTION OF THE SEVERAL VIEWS OF THE DRAWING(S)

In the following, the invention is illustrated using Figures without any intention to limit the scope of the invention.

DETAILED DESCRIPTION OF THE INVENTION

Figure 1:
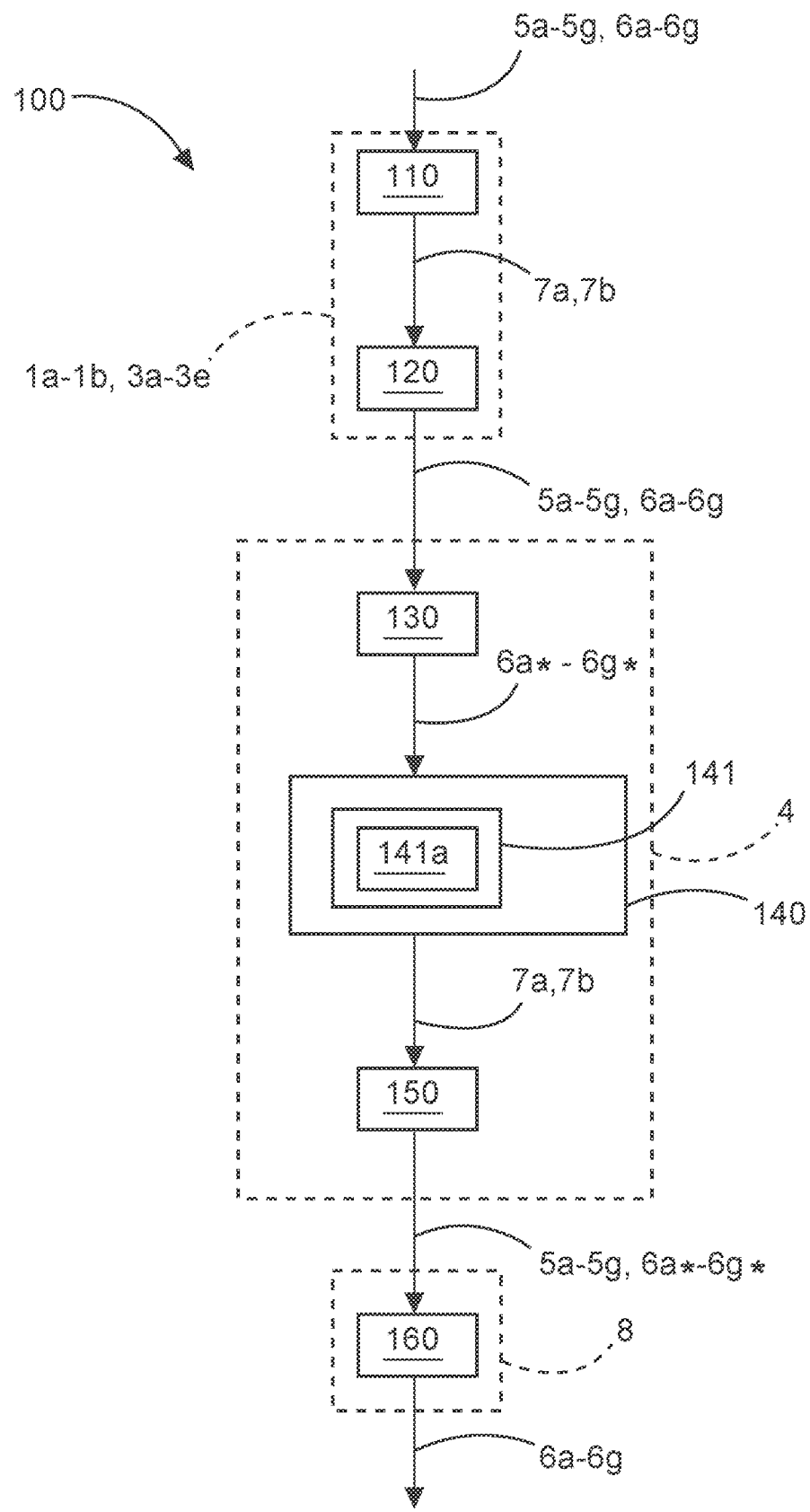
FIG. 1 illustrates an exemplary embodiment of a method for operating a TSN in accordance with the disclosure.

FIG. 1 is a schematic flow chart of an embodiment of the method 100 for operating the TSN 1. As it will be shown in FIG. 2 in more detail, the TSN 1 comprises network elements 3a-3i, 4 that are interconnected by physical links 2a-2i. The TSN 1 comprises a first, high-importance segment 1a with network elements 3a-3b and a second, low-importance segment 1b with network elements 3c-3e.

In step 110, on the network elements 3a-3e in segments 1a and 1b, data streams 5a-5g that carry priority labels 6a-6g are split into a "preempting" class 7a and a "preemptable" class 7b based on a mapping from the priority labels 6a-6g to classes 7a, 7b that is configured separately for each segment 1a, 1b.

In step 120, the data streams 5a-5g are forwarded to respective next-hop network elements 3a-3e, 4, wherein the forwarding of data streams 5a-5g in the "preempting" class 7a takes precedence over the forwarding of data streams 5a-5g in the "preemptable" class 7b.

In step 130, the border network element 4 employs TSN per-port priority regeneration to remap priority labels 6a-6g attached to data streams 5a-5g received on the first port 4a and the second port 4b to updated priority labels 6a*-6g*. This remapping is performed such that no data stream 5a-5c originally received on the first port 4a has the same updated priority label 6a*-6g* as any data stream 5d-5g originally received on the second port 4b.

In step 140, on the border network element 4, the data streams 5a-5g are split into a "preempting" class 7a and a "preemptable" class 7b with respect to the forwarding on to a next-hop network element 8. This splitting is based on a mapping from updated priority labels 6a*-6g* to classes 7a, 7b that is configured on the border network element 4.

According to block 141, on the border network element 4, memory may be allocated for the queuing of frames of received data streams 5a-5g such that queues for frames of "preemptable" data streams 5a-5g are able to accommodate more frames than queues for frames of "preempting" data streams 5a-5g. According to block 141a, the sizes of the queues may be made dependent also on the updated priority labels 6a*-6g* of the data streams 5a-5g.

In step 150, the data streams 5a-5g are forwarded from the border network element 4 to at least one next-hop network element 8. At least in case of congestion on a link 2f to the next-hop network element 8, the forwarding of data streams 5a-5g in the "preempting" class 7a takes precedence over the forwarding of data streams 5a-5g in the "preemptable" class 7b.

In step 160, the next-hop network element 8 may optionally restore the original priority labels 6a-6g.

Figure 2:
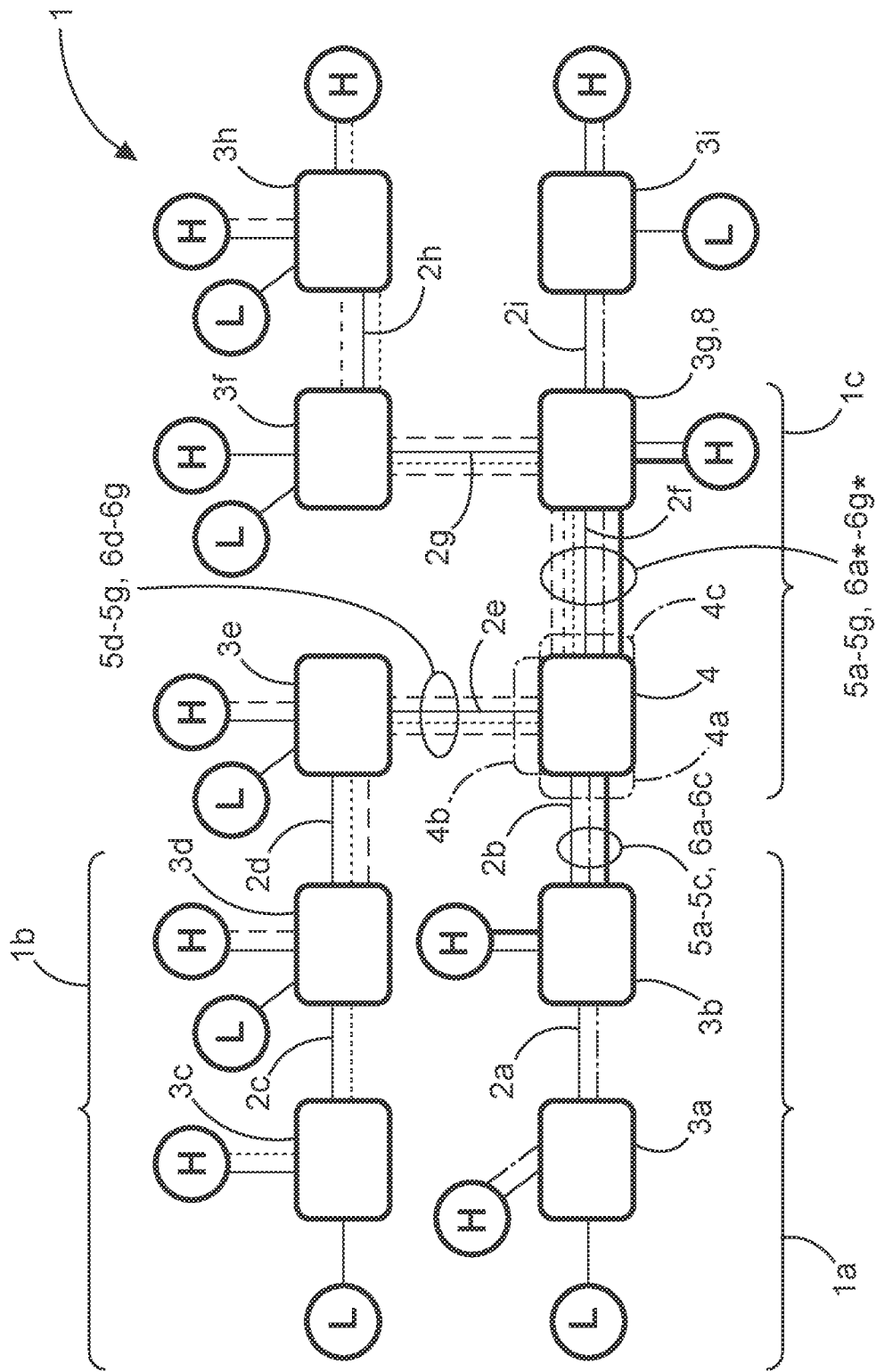
FIG. 2 illustrates an exemplary network geometry having a congestion-prone segment, in accordance with the disclosure.

FIG. 2 shows an exemplary network geometry of a TSN 1. The TSN 1 comprises network elements 3a-3i, 4 that are interconnected by physical links 2a-2i. Network elements 3a and 3b with links 2a and 2b form a first, high-importance segment 1a. Network elements 3c, 3d and 3e with links 2c, 2d and 2e form a second, low-importance segment 1b. The first segment 1a produces data streams 5a-5c with priority labels 6a-6c. The second segment 1b produces data streams 5d-5g with priority labels 6d-6g.

Both segments 1a and 1b are connected to the border network element 4. The first segment 1a is connected to a first port 4a, and the second segment 1b is connected to a second port 4b of the network element 4. The border network element 4 remaps the priority labels 6a-6g to updated priority labels 6a*-6g* and forwards all data streams 5a-5g to the next-hop network element 3g, 8 to which it is connected via a third port 4c. Since all the data streams 5a-5g have to travel across one single physical link 2f between the border network element 4 and the next-hop network element 8, the segment 1c comprising the border network element 4, the next-hop network element 8 and the physical link 2f is a congestion-prone segment.

When the next-hop network element 3g, 8 forwards the data streams further on to other network elements 3f and 3i, it does so via multiple links 2g, 2i, so there is less propensity for a congestion of one of those links 2g, 2i.

Figure 3:
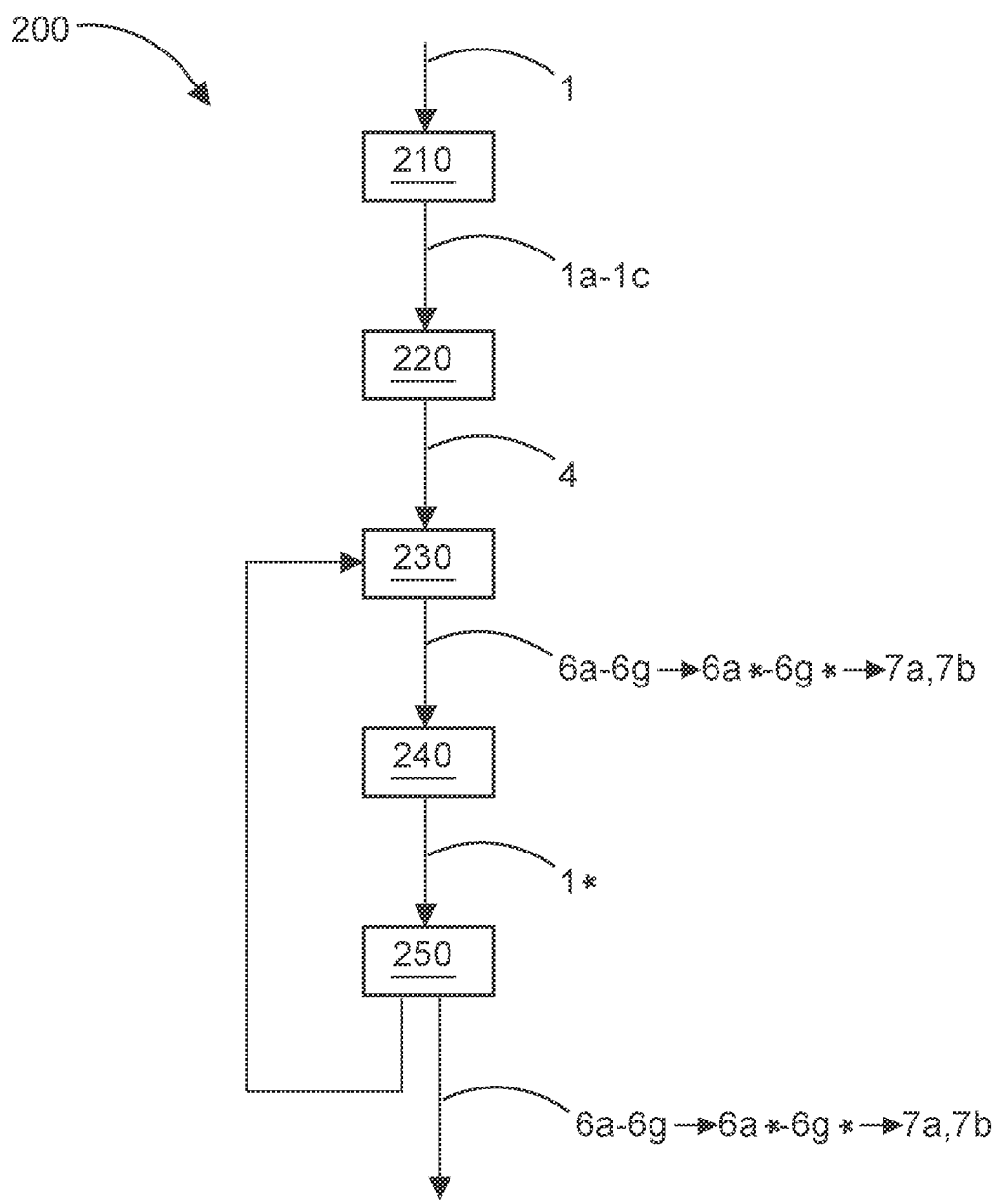
FIG. 3 illustrates an exemplary embodiment of a method for configuring a TSN in accordance with the disclosure.

FIG. 3 is a schematic flow chart of the method 200 for configuring the TSN 1, e.g., the TSN 1 shown in FIG. 2.

In step 210, at least one segment 1c of the TSN 1 is identified that provides connectivity to or from at least a first further segment 1a and a second further segment 1b of the TSN 1. That is, a constellation of the first further segment 1a, the second further segment 2b, and the segment 1c that is needed by both segments 1a and 1b, is identified. As discussed before, the segment 1c is a congestion-prone segment because simultaneous high traffic going into and/or out or both segments 1a and 1b may overload it.

In step 220, a network element 4 that is connected to the first further segment 1a by a first port 4a, to the second further segment 1b by a second port 1b, and to the congestion-prone segment 1c by a third port 4c, is identified as a border network element 4.

In step 230, the border network element 4 is configured to: remap, using TSN per-port priority regeneration, priority labels 6a-6g attached to data streams 5a-5g received on the first port 4a and the second port 4b to updated priority labels 6a*-6g*, such that no data stream 5a-5g originally received on the first port 4a has the same updated priority label 6a*-6g* as any data stream 5a-5g originally received on the second port 4b; split the data streams 5a-5g into a "preempting" class 7a and a "preemptable" class 7b based on a mapping from updated priority labels 6a*-6g* to classes 7a, 7b; and forward the data streams received on the first port 4a and the second port 4b to the third port 4c. The forwarding of data streams 5a-5g in the "preempting" class 7a takes precedence over the forwarding of data streams 5a-5g in the "preemptable" class 7b.

In step 240, at least one key performance indicator 1* of the TSN 1 is monitored and/or simulated.

In step 250, the remapping of the priority labels 6a-6g, and/or the splitting of the data streams 5a-5g into the "preempting" class 7a and the "preemptable" class 7b, is optimized with the goal of improving the key performance indicator 1*.

In the embodiments described herein, the segments are independent in that traffic within the first segment on the one hand and traffic within the second segment on the other hand pass through different sets of physical links in the TSN. The first segment and the second segment are connected by a border network element. The first segment is connected to a first port of the border network element, and the second segment is connected to a second port of the border network element. By means of a third and more ports, the border network element may connect the first and second segment to the outside world, i.e., further segments of the TSN, or the Internet.

Data streams received on the first port and the second port have priority labels attached to them. These priority labels may, for example, Time-Aware Traffic Shaping, TAS, priorities. According to the TSN standard, there are eight different TAS priorities. In the course of the method, the border network element remaps these priority labels to updated priority labels such that no data stream originally received on the first port has the same updated priority label as any data stream originally received on the second port.

The border network element splits the data streams into a "preempting" class and a "preemptable" class based on a mapping from updated priority labels to classes. For example, if there are 8 priority levels from 0 to 7, priority levels 7 to 4 may be mapped to the "preempting" class, and priority levels 3 to 0 may be mapped to the "preemptable" class.

The border network element forwards the data streams to at least one next-hop network element. At least in case of congestion on a link to the next-hop network element, the forwarding of "preempting" data streams takes precedence over the forwarding of "preemptable" data streams. That is, frames of "preemptable" data streams may have to wait in a queue to be transmitted until transmission of frames belonging to "preempting" data streams is finished.

The first and second network segments may be managed independently. This means that a first data stream in the first network segment may be assigned a particular priority label (e.g., 5), and a second data stream in the second network segment may be assigned the same priority label. After the remapping, the two data streams will have different updated priority labels. Thus, at the time of splitting into the "preempting" and "preemptable" classes, the updated priority labels reflect that the first data stream is more important than the second data stream because it originates from the more important first network segment. Consequently, the first data stream may be mapped to the "preempting" class, and the second data stream may be mapped to the "preemptable" class, so that the first data stream is delivered with a better determinism at the expense of the second data stream.

On top of the condition that no data stream originally received on the first port has the same updated priority label as any data stream originally received on the second port, the remapping and the subsequent splitting may proceed according to any suitable set of rules that take into account the importance of each data stream with respect to the application at hand.

In one simple example, all data streams from the first, high-importance segment may be assigned updated priority labels that will cause them to be mapped to the "preempting" class during the splitting, whereas all data streams from the second, low-importance segment may be assigned updated priority labels that will cause them to be mapped to the "preemptable" class during the splitting.

In another example, the remapping may raise the priority labels of data streams from the first segment and lower the priority labels of data streams from the second segment. During the splitting, all data streams with a priority label above a predetermined threshold may then be mapped to the "preempting" class, whereas the data streams with a priority label below this threshold may be mapped to the "preemptable" class. In this manner, the original priority labels of the data streams, which reflect their relative prioritization within the respective network segments, still have some bearing on the final decision whether these data streams will be mapped to "preempting" or "preemptable".

Thus, the prioritization within each network segment and the processing on the border network element may work hand in hand to improve the determinism with which system-important traffic is conveyed through the TSN. But an improvement of this determinism may also be achieved if an existing TSN is taken as it is and only the processing on the border network element is modified. That is, the determinism may also be improved by making only changes in one single place. One advantage of making a change in only one place is that an existing, tried-and-tested prioritization and configuration within the individual network segments can remain as it is. In some high-risk applications, such as chemical or nuclear processes, any configuration change may be dependent on prior regulatory approval. It is far easier to get such approval for a change that only affects the border network element, and thus leaves communication within each network segment as it is, than to get it for a complete redesign of the TSN.

In an advantageous embodiment, the next-hop network element may restore the original priority labels of the data streams. In this manner, the effect of the remapping may be limited to the link between the border network element and the next-hop network element. For example, the remapping and the splitting on the border network element may be specifically used to relieve a congestion on a link between the border network element and the next-hop network element that is a bottleneck within the TSN, but once this bottleneck has been passed, the original prioritization information may be re-used. For example, a link between the border network element and the next-hop network element may become bottleneck-prone if it has to carry traffic to or from several network segments and it has a lesser bandwidth than the combined bandwidths of said several network segments.

In a further advantageous embodiment, data streams may already be split into a "preempting" class and a "preemptable" class on network elements in the first and second segments. These network elements may then forward the data streams to respective next-hop network elements such that, at least in case of congestion on a link to the respective next-hop network element, the forwarding of "preempting" data streams takes precedence over the forwarding of "preemptable" data streams. The mappings from priority labels to classes differ between the first and second segments. That is, there is a segment-wise preemption configuration. In this context, the combination of the remapping and the splitting on the border network element according to the present method permits to use the TSN preemption mechanism on the uplink from the border network element to the outside world, while leaving the existing preemption configuration in the individual network segments intact. But there may also be any degree of coordination and cooperation between the configurations of the individual network segments and the configuration of the border network element.

In one example, the mapping between priority labels and classes within the first and/or second network segment, the remapping of priority labels on the border network element, and the mapping from updated priority labels to classes on the border network element, may be coordinated such that no data stream that is in the "preemptable" class within the first and/or second network segment is in the "preempting" class upon forwarding from the border network element. In this manner, it is avoided that a privileged handling of a data stream by the border network element "goes to waste": By virtue of having been in the "preemptable" class in its originating network segment before reaching the border network element, it is already "tainted" with non-determinism. Transmission of this data stream can no longer be made highly deterministic by privileged handling on the border network element.

In another example, the mapping between priority labels and classes within the first and/or second network segment, the remapping of priority labels on the border network element, and the mapping from updated priority labels to classes on the border network element, are coordinated such that at least one system-important data stream is in the "preempting" class both within the first and/or second network segment and upon forwarding from the border network element. In this manner, this particular system-important data stream may be transported through the whole TSN in a highly deterministic manner. The privileged handling of the data stream in its originating network segment is not "wasted" by virtue of a non-deterministic handling on the border network element.

As discussed before, the TSN may be chosen to comprise controllers, sensors and actuators of a distributed control system, DCS, for an industrial plant as participants. In this manner, the TSN may take the place of a previous proprietary field bus network without sacrificing the determinism.

In the context of a DCS, at least one data stream that is part of a closed feedback loop of an industrial process may be chosen as a system-important data stream. Transmission of such data-streams is time-critical because an undue delay may cause the process to escalate beyond control. For example, a pressure in a vessel may rise beyond the physical limits of the vessel in a very short time if the measurement value of this pressure is delayed in the network and does not reach the controller in time to react, or if the command from the controller to open a relief valve is lost in the network and this valve is not opened.

In a further advantageous embodiment, memory for the queuing of frames of received data streams is allocated on the border network element such that queues for frames of "preemptable" data streams are able to accommodate more frames than queues for frames of "preempting" data streams. The border network usually stores received frames of data streams in a queue and forwards them according to the "first-in-first-out" (FIFO) principle. For example, there may be one queue per possible priority label. If there is congestion and one "preemptable" data stream has to wait for another "preempting" data stream, the queue for that priority label may fill up. Once the queue is full, either newly arriving frames for this queue may be dropped, or these newly arriving frames may cause the oldest frames at the front of the queue to be dropped. The larger the queue, the lesser the probability that data is lost in this manner. If there is a limited amount of queue space to work with, then it is advantageous to concentrate this on data streams that have a higher propensity of being left waiting. By contrast, highly prioritized "preempting" data streams do not need a large queue because the frames will not be waiting there for long. The sizes of the queues may furthermore be made dependent also on the updated priority labels of the data streams, which are a further indicator of the probability that frames of a particular data stream will have to wait to be transmitted.

The present disclosure also describes a method for configuring a time sensitive network, TSN. This TSN comprises a plurality of network elements that are interconnected by links. The network elements are configured to forward data streams to respective next-hop network elements.

The method starts with identifying at least one segment of the TSN that provides connectivity to or from at least a first further segment and a second further segment of the TSN as a congestion-prone segment. In particular, if the available bandwidth in this segment is less than the combined bandwidths of the first and second further segments, simultaneous high activity in both further segments may overload the congestion-prone segment.

Next, a network element that is connected to the first further segment by a first port, to the second further segment by a second port, and to the congestion-prone segment by a third port, is identified as a border network element. This border network element is then configured to: remap, using TSN per-port priority regeneration, priority labels attached to data streams received on the first port and the second port to updated priority labels, such that no data stream originally received on the first port has the same updated priority label as any data stream originally received on the second port; split the data streams into a "preempting" class and a "preemptable" class based on a mapping from updated priority labels to classes; and forward the data streams received on the first port and the second port to the third port, wherein the forwarding of "preempting" data streams takes precedence over the forwarding of "preemptable" data streams.

In this manner, as discussed above, the TSN network is improved in that data streams from a more important network segment may take precedence over other data streams on the congestion-prone segment even if they are both labelled as "important" in the context of the respective first and second further network segments.

The configuration may be performed in a fully automatic manner. The information about the geometry of the network is typically available in electronic form and may be parsed by machine. The border network element may be configured by software. No manual engineering of the TSN as a whole is required, whereas any engineering that has already gone into the individual further network segments is preserved.

In a further advantageous embodiment, at least one key performance indicator of the TSN is monitored and/or simulated. The remapping of the priority labels, and/or the splitting of the data streams into the "preempting" class and the "preemptable" class, is then optimized with the goal of improving the key performance indicator. For example, a plurality of candidate configurations of the remapping and/or the splitting may be set up, and for each such candidate configuration, the key performance indicator may be computed. A candidate configuration with the best value of the key performance indicator may then be implemented on the border network element.

In particular, the key performance indicator may comprise one or more of: a data throughput in the congestion-prone network segment; a latency of delivery of at least one data stream; a rate of frame loss of at least one data stream; and a measure for determinism of delivery of at least one data stream.

The optimizing for one or more key performance indicator may again be performed in a fully automatic manner. Thus, the fine-grained breakdown of the priority of data streams into 8 different priority labels as per the current TAS feature is no longer tied to a requirement for more manual configuration of the TSN as a whole. There is no longer a choice to be made between eight priorities and much manual configuration, or only two preemption classes and less manual configuration.

The methods may be wholly or partially computer-implemented. The invention therefore also provides one or more computer programs with machine readable instructions that, when executed on one or more computers, cause the one or more computers to perform one of the methods described above. In particular, a virtualization platform and one or more hardware controllers may be regarded as computers.

The disclosure also describes one or more non-transitory storage media and/or download products with the one or more computer programs. A download product is a product that may be sold in an online shop for immediate fulfillment by download. The invention also provides one or more computers with the one or more computer programs, and/or with the one or more non-transitory machine-readable storage media and/or download products.

LIST OF REFERENCE SIGNS 1 time sensitive network, TSN
1a first, high-importance segment of TSN 1
1b second, low-importance segment of TSN 1
1c congestion-prone segment of TSN 1
1* key performance indicator of TSN 1
2a-2i physical links of TSN 1
3a-3i network elements in TSN 1
4 border network element in TSN 1
4a-4c ports of border network element 4
5a-5g data streams
6a-6g priority labels of data streams 5a-5g
6a*-6g* updated priority labels produced by border network element 4
7a "preempting" class for data streams 5a-5g
7b "preemptable" class for data streams 5a-5g
8 next-hop network element
100 method for operating TSN 1
110 splitting data streams 5a-5g into classes 7a, 7b in segments 1a, 1b
120 forwarding data streams 5a-5g within segments 1a, 1b
130 remapping priority labels 6a-6g on border network element 4
140 splitting data streams 5a-5g into classes 7a, 7a based on new labels 6a*-6g*
141 allocating queue memory based on class 7a, 7b
141a allocating queue memory based on new labels 6a*-6g*
150 forwarding data streams 5a-5g to next-hop network element 8
160 restoring original priority labels 6a-6g
200 method for configuring TSN 1
210 identifying congestion-prone segment 1c serving segments 1a, 1b
220 identifying border network element 4
230 configuring border network element 4
240 monitoring and/or simulating key performance indicator 1*
250 optimizing with the goal of improving key performance indicator 1*

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for operating a time-sensitive network (TSN), wherein the TSN comprises at least a first, high-importance segment and a second, low-importance segment, wherein traffic within the first segment and traffic within the second segment passes through different sets of physical links in the TSN, the first segment being connected to a first port of a border network element that connects the first and second segments, and the second segment being connected to a second portion of the border network element, the method comprising:
   remapping, on the border network element, using a TSN per-port priority regeneration, priority labels attached to data streams received on the first port and the second port to updated priority labels, wherein no data stream originally received on the first port has a same updated priority label as any data stream originally received on the second port;
   splitting, on the border network element, the data streams into a preempting class and a preemptable class based on a mapping from updated priority labels to classes; and
   forwarding the data streams from the border network element to at least one next-hop network element, wherein, in response to congestion being present on a link to the next-hop network element, the forwarding of preempting data streams takes precedence over the forwarding of preemptable data streams.

2. The method of claim 1, further comprising restoring, by the next-hop network element, the original priority labels of the data streams.

3. The method of claim 1, further comprising:
   splitting, on network elements in the first and second segments, data streams into a preempting class and a preemptable class based on a mapping from priority labels attached to these data streams to classes; and
   forwarding the data streams to respective next-hop network elements wherein, at least when congestion is present on a link to the respective next-hop network element, the forwarding of preempting data streams takes precedence over the forwarding of preemptable data streams,
   wherein the mapping from priority labels to classes differs between the first and second segments.

4. The method of claim 3, wherein the mapping between priority labels and classes within the first and/or second network segments, the remapping of priority labels on the border network element, and the mapping from updated priority labels to classes on the border network element, are coordinated such that no data stream that is in the preemptable class within the first and/or second network segments is in the preempting class upon forwarding from the border network element.

5. The method of claim 3, wherein the mapping between priority labels and classes within the first and/or second network segments, the remapping of priority labels on the border network element, and the mapping from updated priority labels to classes on the border network element, are coordinated such that at least one system-important data stream is in the preempting class both within the first and/or second network segments and upon forwarding from the border network element.

6. The method of claim 5, wherein at least one data stream that is part of a closed feedback loop of an industrial process being executed on the industrial plant is chosen as a system-important data stream.

7. The method of claim 1, wherein the TSN further includes controllers, sensors and actuators of a distributed control system, DCS, for an industrial plant as participants.

8. The method of claim 1, further comprising allocating, on the border network element, memory for queuing of frames of received data streams such that queues for frames of preemptable data streams accommodate more frames than queues for frames of preempting data streams.

9. The method of claim 8, further comprising sizing the queues based on the updated priority labels of the data streams.

10. A method for configuring a time sensitive network (TSN), wherein the TSN comprises a plurality of network elements that are interconnected by links, wherein the plurality of network elements are configured to forward data streams to respective next-hop network elements, the method comprising:
   identifying at least one segment of the TSN that provides connectivity to or from at least a first further segment and a second further segment of the TSN as a congestion-prone segment;
   identifying a network element that is connected to the first further segment by a first port, to the second further segment by a second port, and to the congestion-prone segment by a third port, as a border network element; and
   configuring the border network element to:
      remap, using TSN per-port priority regeneration, priority labels attached to data streams received on the first port and the second port to updated priority labels, such that no data stream originally received on the first port has a same updated priority label as any data stream originally received on the second port;

split the data streams into a preempting class and a preemptable class based on a mapping from updated priority labels to classes; and forward the data streams received on the first port and the second port to the third port, wherein the forwarding of preempting data streams takes precedence over the forwarding of preemptable data streams.

11. The method of claim 10, further comprising monitoring and/or simulating at least one key performance indicator of the TSN; and optimizing the remapping of the priority labels, and/or the splitting of the data streams into the preempting class and the preemptable class, with the goal of improving the key performance indicator.

12. The method of claim 11, wherein the key performance indicator comprises one or more of:

a data throughput in the congestion-prone network segment;

a latency of delivery of at least one data stream;

a rate of frame loss of at least one data stream; and a measure for determinism of delivery of at least one data stream.

* * * * *